(12) United States Patent
Yamanaka

(10) Patent No.: US 7,065,985 B2
(45) Date of Patent: Jun. 27, 2006

(54) MOLDING DIE FOR OPTICAL ELEMENT WITH LENS-BARREL

(75) Inventor: Hajime Yamanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 413 days.

(21) Appl. No.: 10/246,822

(22) Filed: Sep. 17, 2002

(65) Prior Publication Data

US 2003/0056544 A1     Mar. 27, 2003

(30) Foreign Application Priority Data

Sep. 27, 2001 (JP) .............................. 2001-297486

(51) Int. Cl.
    *C03B 11/00*    (2006.01)
    *C03B 11/08*    (2006.01)
    *B28B 3/08*     (2006.01)

(52) U.S. Cl. ........................... 65/305; 65/323; 425/408

(58) Field of Classification Search .................. 65/305, 65/323, 246, 247; 425/406–408, 411; 249/160, 249/164, 167
    See application file for complete search history.

(56) References Cited

U.S. PATENT DOCUMENTS

| | | | | |
|---|---|---|---|---|
| 3,214,254 A | * | 10/1965 | Remington | .................. 65/32.5 |
| 4,591,373 A | * | 5/1986 | Sato | ........................... 65/29.19 |
| 2002/0184921 A1 | * | 12/2002 | Kawata et al. | ................. 65/102 |

FOREIGN PATENT DOCUMENTS

| | | | |
|---|---|---|---|
| JP | 60-129220 | | 7/1985 |
| JP | 63-265833 | * | 11/1988 |
| JP | 03-146427 | * | 6/1991 |
| JP | 4-21528 | | 1/1992 |
| JP | 04-317427 | * | 11/1992 |
| JP | 06-271323 | * | 9/1994 |
| JP | 07-2115721 | * | 8/1995 |

* cited by examiner

*Primary Examiner*—Carlos Lopez
(74) *Attorney, Agent, or Firm*—Jordan and Hamburg, LLP

(57) ABSTRACT

A molding die for an optical element with a lens-barrel in which the lens-barrel is set in the molding die includes a tubular guide die, a upper die and a lower die sliding in the guide die Also an optical raw material is placed in the lens-barrel and the optical element is sandwiched, heated and pressurized between the upper die having a transfer surface and the lower die having a transfer surface, thereby integrally forming the optical element in the lens-barrel. Outside diameter portions designed to be equal to the inner diameter of the guide die are provided for the upper die and lower die, wherein the outside diameter portion is fitted in the guide die so as to be able to slide only in the axial direction.

1 Claim, 6 Drawing Sheets

MOLDING DIE FOR OPTICAL ELEMENT WITH LENS-BARREL

BACKGROUND OF THE INVENTION

1. Field of the Invention

The invention relates to a molding die for forming an optical element with a lens-barrel, in which an optical raw material (or glass raw material) is placed in the lens-barrel set in the molding die and heated and pressurized between a upper die and a lower die and thereby the optical element is integrally formed in the lens-barrel.

2. Description of the Related Art

In recent years, in forming an optical element (or a glass-formed component) by heat softening an optical raw-material (or an optical glass) in a heating furnace and thereafter heating and pressurized it between a upper die and a lower die, a method of manufacturing an optical element with a lens-barrel has been used. In this method, a lens-barrel is set in a molding die comprising a guide die, the upper die and the lower die, and also an optical raw material (or a glass raw material) is placed in the lens-barrel, and the optical raw material is sandwiched, heated and pressurized between the upper die and lower die to cause the optical raw material (or glass material) to flow in the direction of the outer periphery thereof, and thus the outer edge of the optical raw material is caused to tightly join to the inner peripheral surface of the lens-barrel, thereby integrally forming the optical element in the lens barrel (see the gazette of JP-A-4-21528).

FIG. 1 shows a molding die for an optical element with a lens-barrel according to a conventional technology.

A molding die shown in FIG. 1 comprises a guide die 1, a upper die 2 and a lower die 3. Therein, a lens-barrel 10 is placed at a lens-barrel-placing portion 1C provided in the guide die 1, and also an optical raw material 20 placed in the lens-barrel 10 is sandwiched, heated and pressurized between the upper die 2 and lower die 3. Thereby, the transfer surfaces 2A and 3A of the upper die 2 and lower die 3 are transferred to the optical raw material 20 to mold an optically functioning portion, and at the same time, the optical raw material 20 is caused to flow in the direction of the outer periphery thereof, whereby the optical raw material is tightly joined to the inner peripheral surface of the lens barrel 10, thus forming an optical element with a lens barrel.

By the way, in the conventional example shown in FIG. 1, the guide die 1 uses the combination of guide dies 1A and 1B divided in the upper and lower parts. When the formed optical element with a lens barrel is taken out from the guide die 1, conventionally the guide dies 1A and 1B are separated, such that the optical element with a lens barrel placed in the lens-barrel-placing portion 1C is taken out.

When the optical element is formed in the lens barrel 10 placed in the lens-barrel-placing portion 1C as in the molding die of the conventional technology, in order that the position deviation of the lens barrel 10 set in the molding die may cause no optical-axis deviation of the optical element integrally formed, (1) the inside diameter of the lens-barrel-placing portion 1C of the guide die 1 is designed to the outside diameter of the lens-barrel 10, and also (2) the outside diameter of the lower die 3 (upper die 2) is designed to the inside diameter of the guide die 1, or the inside diameter of the guide die 1 is designed to the outside diameter of the lower die 3 (upper die 2).

However, in order to fit the lens-barrel 10 on the outer periphery of the lower die 3 without giving an impact to the lens barrel 10, design looseness is provided between the outside diameter of the lens-barrel 10 and the inside diameter of the lens-barrel-placing portion 1C of the guide die 1 (for example, the inside diameter of the lens-barrel-placing portion is made about 10 μm larger than the outside diameter of the lens barrel) and, at the same time, in order to slide the lower die 3 (upper die 2) in the guide die, design looseness is provided between the outside diameter of the lower die 3 (upper die 2) and the inside diameter of the guide die 1 (for example, the inside diameter of the guide die is made about 10 μm larger than the outside diameters of the upper die and lower die). Due to (1) the looseness between the outside diameter of the lens-barrel 10 and the inside diameter of the lens-barrel-placing portion 1C of the guide die 1 and (2) the looseness between the inside diameter of the guide die 1 and the outside diameter of the lower die 3 (upper die 2), particularly in the case of manufacturing a small optical element with a lens-barrel, the position of the transfer surface 3A of the lower die 3 (the transfer surface 2A of the upper die 2) is deviated with respect to the lens-barrel 10, and thus conventionally an optical-axis deviation occurs in the optical element molded in the lens-barrel 10.

Further, in the molding die of the conventional technology, an optical element placed on the transfer surface 2A of the lower die 3 is integrally formed on the inner peripheral surface of the lens-barrel 10 held by the lens-barrel-placing portion 1C of the guide die 1. For this reason, there is a fear that the axial position deviation of the optical element formed on the inner peripheral surface of the lens barrel 10 may be caused by the looseness between the barrel length of the lens-barrel 10 and the length of the lens-barrel-placing portion 1C.

On the other hand, JP-A-60-129220 discloses a molding die in which the lens-barrel is placed on the lower die. FIG. 2 shows the molding die disclosed by JP-A-60-129220. Therein, by sliding a fitting portion 32 of the lower die 3 and a fitting portion 21 of the upper die 2 in the lens-barrel placed on the bottom 31 of the lower die 3, and adjusting the axial positions of the upper die 2 and the lower die 3 by a spacer 4 provided on the bottom 31, an optical raw material (or a glass material) 20 placed in the lens-barrel is sandwiched, heated and pressurized between the transfer surface 2A of the upper die 2 and the transfer surface 3A of the lower die 3, thereby manufacturing an optical element integrally formed in the lens-barrel. However, in this molding die, the positioning of the center axes of the upper die 2 and the lower die 3, that is, the positioning of the optical axis of the optical element formed in the lens barrel is performed by the contact between the inner peripheral surface of the lens-barrel 10 and the fitting portions 21 and 32 of the upper die 2 and lower die 3. At this time, a large load is imposed on the lens-barrel 10. Particularly in the case of manufacturing a small optical element with a lens-barrel, because the wall of the lens-barrel 10 is thin in thickness, a problem has arisen in terms of the strength of the lens-barrel 10. That is, because of a large load imposed on the lens-barrel 10, there has been problems in terms of accuracy, such as the lens-barrel 10 is deformed and the accurate positioning of the optical element integrally formed in the lens-barrel is prevented by the deformation of the lens-barrel 10.

SUMMARY OF THE INVENTION

Therefore, the invention has an object to provide a molding die for an optical element with a lens-barrel, allowing a less optical-axis deviation and a constant axial position of the optical element molded on the inner peripheral surface of the lens-barrel in manufacturing the optical element with a lens-barrel.

In order to achieve the above object, according to the invention, in a molding die for an optical element with a lens-barrel, in which the lens-barrel is set in the molding die comprising a tubular guide die, a upper die and a lower die sliding in the guide die and also an optical raw material is placed in the lens-barrel and the optical element is sandwiched, heated and pressurized between the upper die and lower die having transfer surfaces, thereby integrally forming the optical element in the lens-barrel, outside diameter portions designed to be equal to the inner diameter of the guide die are provided for the upper die and lower die, wherein the outside diameter portions are fitted in the guide die so as to be able to slide only in the axial direction, and thereby the positioning of the upper die and the lower die is performed in the directions perpendicular to the axes thereof, causing the center axes of the upper die and the lower die to coincide with each other, and further a reference surface is molded on the lower die, the lens-barrel being placed on the reference surface, and also a fitting portion is molded on the upper die or/and the lower die and is fitted in the lens-barrel for holding the lens-barrel, and a transfer surface is provided on the end of the fitting portion.

DETAILED DESCRIPTION OF THE PREFERRED EMBODIMENTS

Hereinafter, a suitable embodiment of the invention will be described with reference to drawings.

Figure 3:
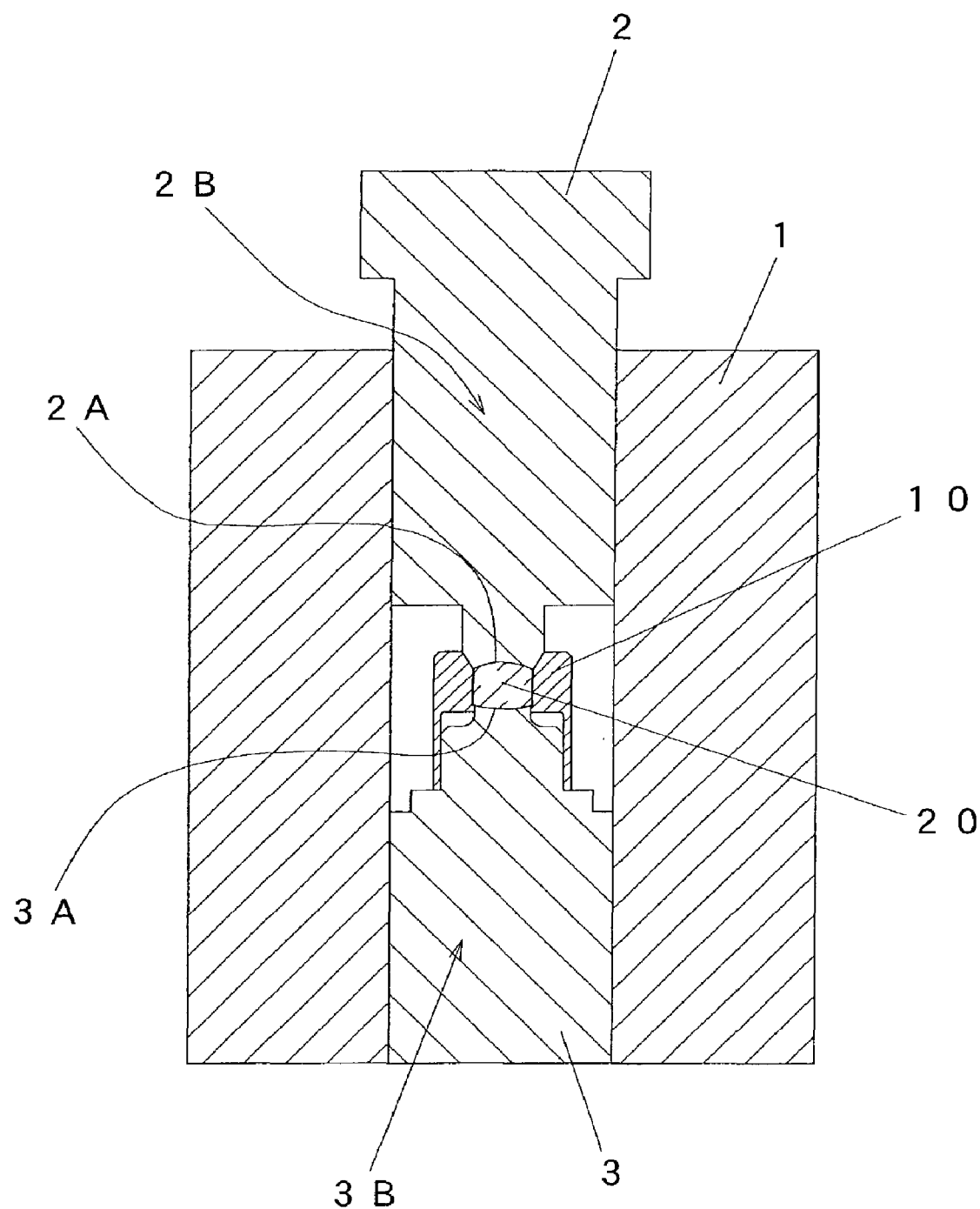
FIG. 3 shows a cross sectional view of a molding die according to a first embodiment of the invention.

FIG. 3 shows a cross sectional view of a molding die for an optical element with a lens-barrel according to a first embodiment of the invention. Therein, the figure shows a molding die for forming an optical element with a lens-barrel, in which an optical element is tightly joined to the inner peripheral surface of the upper end side of a lens barrel 10 set in the molding die comprising a guide die 1, a upper die 2 and a lower die 3.

The molding die comprises the tubular guide die 1, the upper die 2 and lower die 3 molded like a circular cylinder, and an optical raw material (or a glass material) 20 is sandwiched, heated and pressurized between the upper die 2 and lower die 3 sliding in the tubular guide die 1, thereby transferring transfer surfaces 2A and 3A to the optical raw material 20 to mold an optically functioning surface. At the same time, the optical raw material 20 is caused to flow in the outer periphery thereof, and the outer edge of the raw material 20 is caused to tightly join to the inner peripheral surface of the lens barrel 10, thereby manufacturing an optical element with a lens-barrel, in which an optical element is integrally formed in lens-barrel.

By the way, the guide die 1, upper die 2, and lower die 3 made of a hard metal member such as tungsten carbide are preferably used for the molding die.

Figure 4:
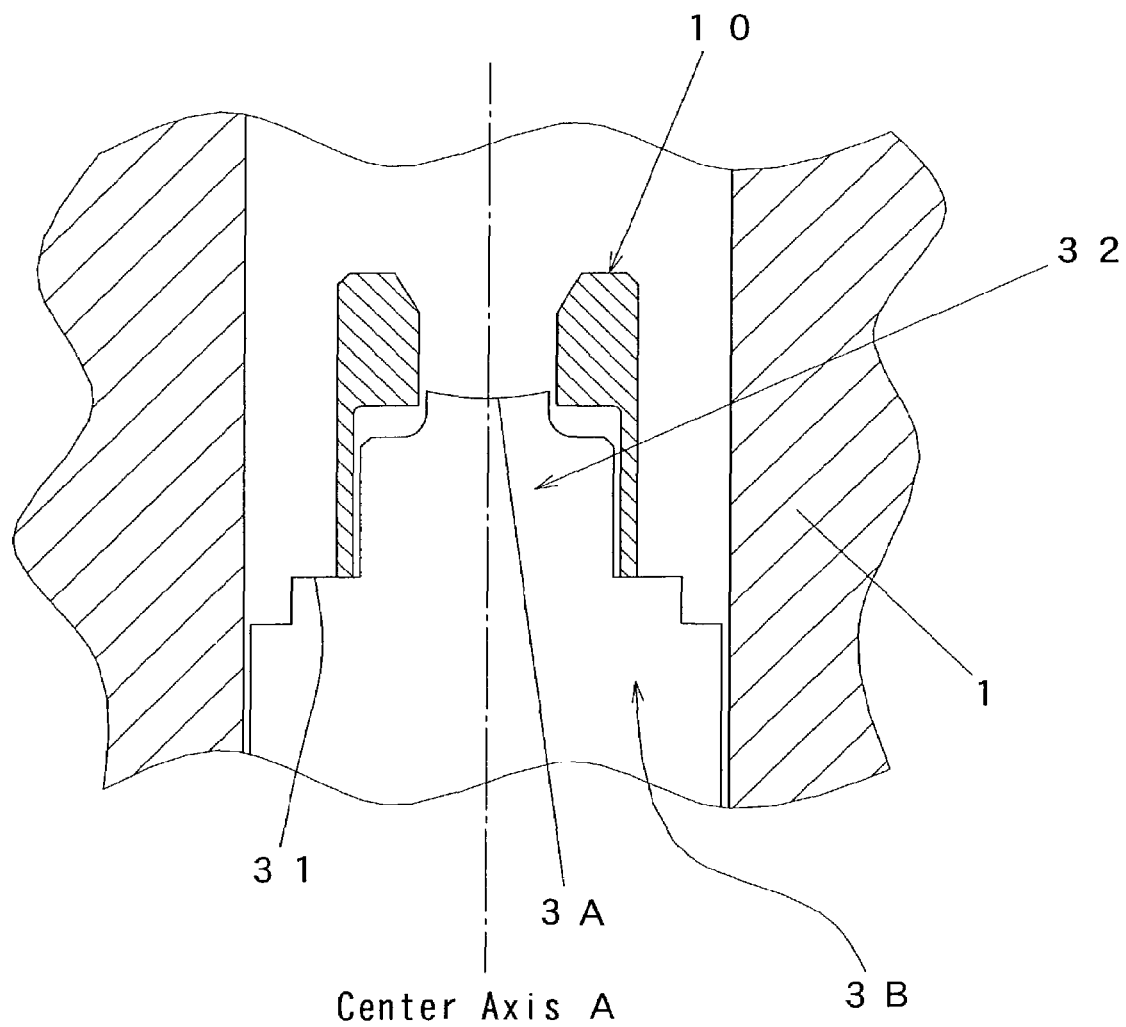
FIG. 4 shows a cross sectional view of a lower die of the molding die shown in FIG. 3.

As shown in FIG. 4, in the molding die according to the present embodiment, the lower die 3 having the transfer surface 3A is provided with a reference surface 31, on which the lens-barrel 19 is placed, and a fitting portion 32 to be fitted in the inner periphery of the lens-barrel 10.

In the same figure, a center axis A extending in the vertical direction is the center axis of the inner periphery of the guide die 1. In order that the optical axis of the optical element molded within the lens-barrel may coincide with this center axis A, the outside diameters of the upper die 2 and lower die 3, molded like a circular cylinder and sliding on the inner periphery of the tubular guide die 1, are designed to the inside diameter of the guide die 1. Further, the transfer surfaces 2A and 3A are molded to sit in the center portions of the upper die 2 and lower die 3, respectively. That is, the lens-barrel 10 is fitted on the fitting portion 32 molded on the lower die 3 and also placed on the reference surface 31 molded on the lower die 3. Thus, it is possible to prevent the position deviation of the lens-barrel 10 held on the lower die 3, and to prevent the optical-axis deviation and position deviation of the optical element integrally formed in the lens-barrel 10.

In this embodiment, the fitting portion 32 molded like a circular cylinder is molded by projecting the center portion of the top surface of the lower die 3 in its axial direction. By causing the fitting portion 32 to be inserted into a tubular lens-barrel and thus to be fitted in the inner periphery of the lens barrel 10, the transfer surface 3A molded in the center portion of the end (top surface) of the fitting portion 32 is inserted into the lens-barrel. Then, the outside diameter of the fitting portion 32 is designed to the inner diameter of the lens barrel, thereby preventing the position deviation of the lens-barrel 10 held on the outer periphery of the fitting portion 32. Also, the circular reference surface 31 is molded on the outer periphery of the fitting portion of the top surface of the lower die 3, and the lens-barrel 10 is placed on the reference surface 31. Thereby, the axial position of the lens-barrel 10 is adjusted such that the transfer surface 3A, molded in the center portion of the end (top surface) of the fitting portion 32 fitted in the lens-barrel 10, may be placed at the optical element-forming position.

By the way, the reference surface 31 and the outer peripheral surface of the fitting portion 32 are molded to intersect each other at right angles. This enables the lens-barrel 10 to be held such that the center axis of the lens-barrel 10, placed on the reference surface 31 and fitted on the fitting portion 32, will not incline with respect to the center axis A.

Further, the upper die 2 and the lower die 3 have outside diameter portions 2B and 3B designed to be equal to the inside diameter of the guide die 1. Because these outside diameter portions 2B and 3B is fitted in the guide die so as to be able to slide only in the axial direction, the center axis of the upper die 2 is positioned by the contact (intimate contact) between the inner peripheral surface of the guide die 1 and the outside diameter portion 2B, and the center axis of the lower die 3 is positioned by the contact (intimate contact) between the inner peripheral surface of the guide die 1 and the outside diameter portion 3B. That is, the outside diameter portions 2B and 3B determines the positioning of the upper die 2 and the lower die 3, placed in the guide die, in the direction perpendicular to the axis.

In this embodiment, in order to slide the lower die 3 (upper die 2) in the guide die, design looseness is provided between the outside diameter of the lower die 3 (upper die 2) and the inside diameter of the guide die 1 (for example, the inside diameter is made about 10 μm larger than the outside diameter). In order to fit the lens-barrel 10 on the outer periphery of the fitting portion 32 without giving an impact to the lens-barrel 10, design looseness is provided between the inside diameter of the lens-barrel 10 and the outside diameter of the fitting portion 32 (for example, the inside diameter is made about 10 μm larger than the outside diameter).

Figure 5:
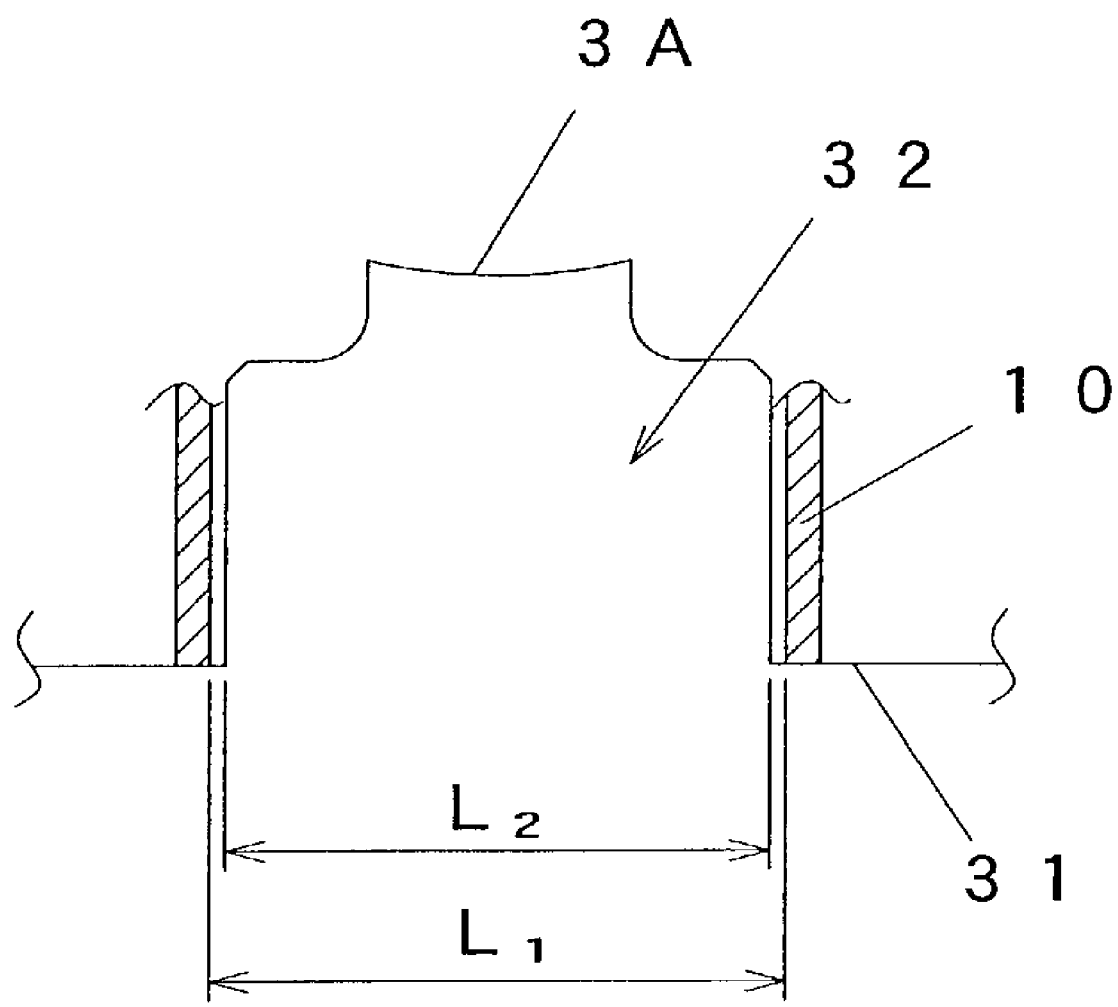
FIG. 5 shows a cross sectional view of a fitting portion of the lower die.

FIG. 5 is a diagram for illustrating the fitting portion 32 fitted into the lens-barrel 10 with reference to the lower die 3 used in this embodiment. The reference character $L_1$ shown in the same figure denotes the inside diameter of the lens-barrel, and the reference character $L_2$ denotes the outside diameter of the fitting portion. As shown in FIG. 5, the fitting portion 32 is fitted into the lens-barrel 10 and at the same time, the lens-barrel 10 is placed on the reference surface 32, thereby holding the lens-barrel 10.

Therefore, in order to avoid the possibility that the position deviation of the lens-barrel 10 held on the outer periphery of the fitting portion 32 may cause the transfer surface 3A, provided on the top surface of the fitting portion 32, to be deviated in position with respect to the lens-barrel, thus resulting in an optical axis deviation of the optical element integrally formed in the lens-barrel, the outside diameter $L_2$ of the fitting portion 32 is designed to the inside diameter $L_1$ of the lens-barrel 10.

Here, a study will be conducted on design looseness causing the optical-axis deviation of the optical element integrally formed in the lens-barrel 10, particularly in the case of manufacturing a small optical element with a lens-barrel.

Figure 1:
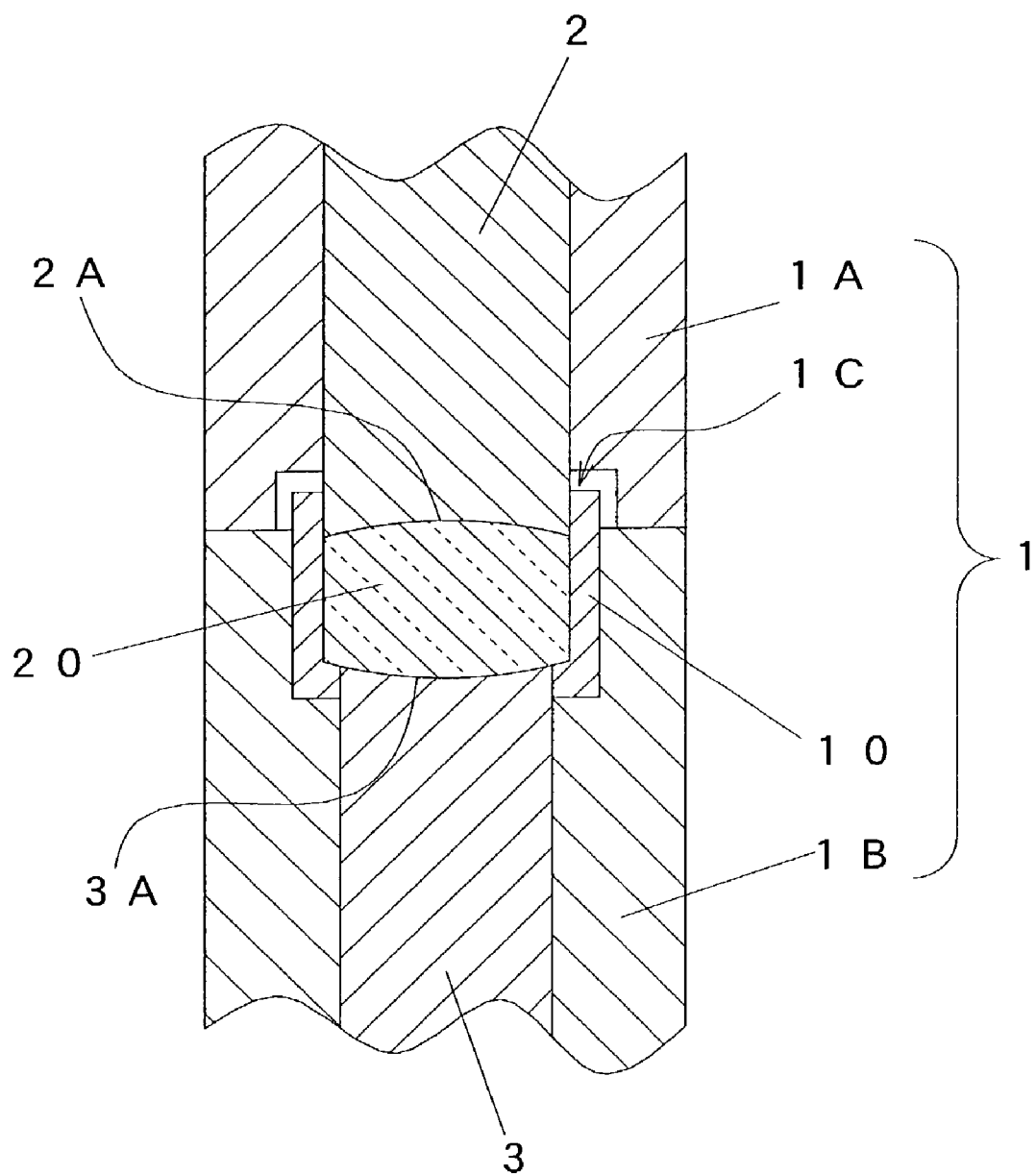
FIG. 1 shows a cross sectional view of a molding die according to a conventional technology.
Figure 2:
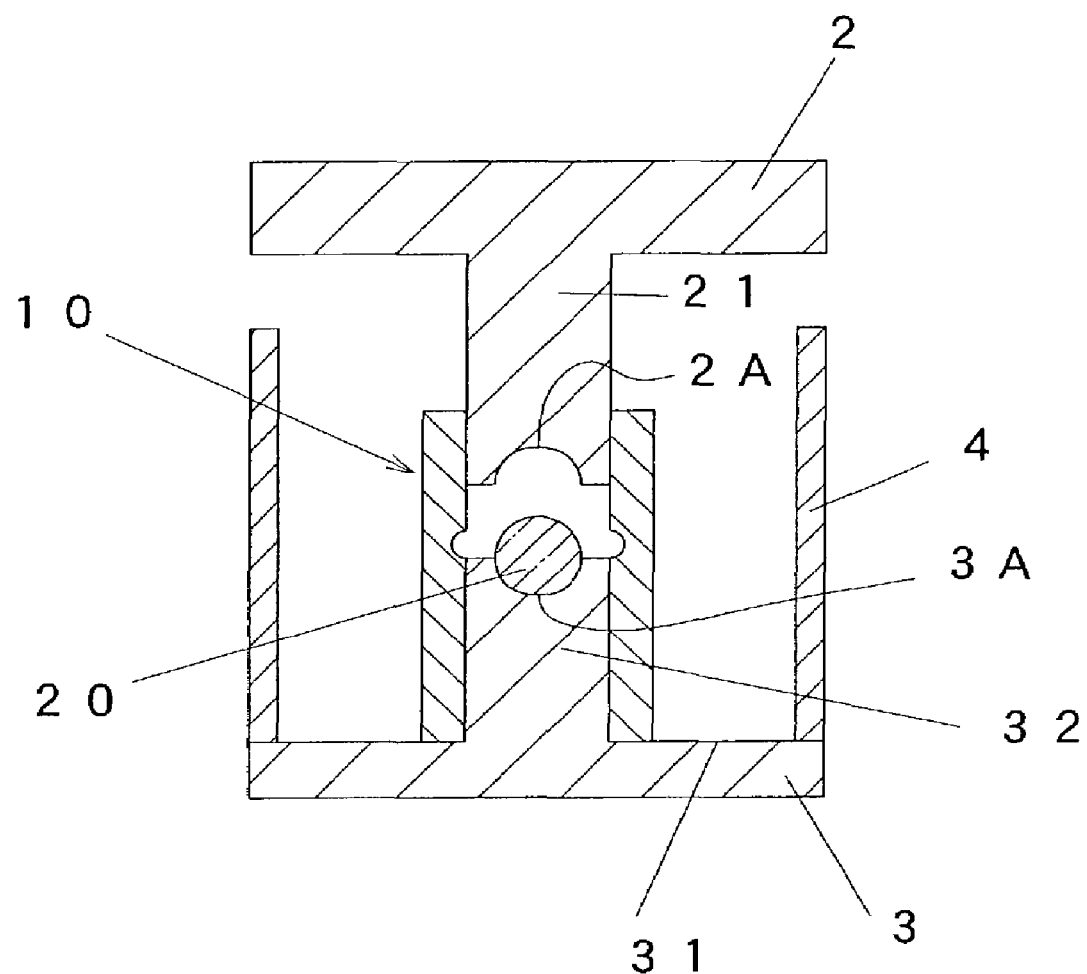
FIG. 2 shows a cross sectional view of a molding die according to another conventional art.

In the conventional technology shown in FIG. 1, the transfer surface 3A is provided on the lower die sliding on the inner peripheral surface of the guide die 1, and the lens-barrel 10 is set in the molding die placed in the lens-barrel-placing portion 1C of the guide die 1, manufacturing a small optical element with a lens-barrel. In this case, because the lens-barrel 10 is positioned and held with respect to the guide die 1, the position deviation of the transfer surface 3A (transfer surface 2A) with respect to the lens-barrel 10 may be caused by the two factors of (1) the looseness between the outside diameter of the lens-barrel 10 and the inside diameter of the lens-barrel-placing portion 1C of the guide die 1 and (2) the looseness between the inside diameter of the guide die 1 and the outside diameter of the lower die 3 (upper die 2), thus resulting in the optical-axis deviation of the optical element integrally formed in the lens-barrel.

In contrast to this, in the present embodiment, the lens-barrel 10 is held (positioned) by the lens-barrel 10 placed on the reference surface 31 and fitted on the fitting portion 32, which fitting portion is molded by axially projecting the center portion of the top surface of the lower die 3 having the transfer surface 3A. That is, the lens-barrel 10 is positioned and held with respect to the lower die 3 but not with respect to the guide die 1. Further, the lens-barrel 10 is held only by the lower die 3 and placed in the state of non-contact with the guide die 1.

Therefore, when a small optical element with a lens-barrel is manufactured by using the molding die according to the invention, the position deviation of the transfer surface 3A with respect to the lens-barrel 10 is caused only by the looseness between the inside diameter $L_1$ of the lens-barrel and the outside diameter $L_2$ of the fitting portion 32. Therefore, it is achieved to remove the factor causing the position deviation of the lens-barrel 10 based on the looseness between the inside diameter of the guide die 1 and the outside diameter of the lower die 3 (upper die 2). As a result, it is possible to decrease the degree of the optical-axis deviation of the optical element integrally formed in the lens-barrel.

Also, both the upper die 2 and the lower die 3 are provided with the outside diameter portions 2B and 3B which are able to slide on the inner peripheral surface of the guide die 1 in intimate contact with it. These outside diameter portions 2B and 3B guide the axial motion of the upper die 2 and lower die 3 in the guide die, positioning the center axes of the upper die 2 and lower die 3. That is, the center axes of the upper die 2 and lower die 3, i.e. the optical axis of the optical element integrally formed in the lens-barrel can be determined without loading the lens-barrel 10. Therefore, there is not the possibility that a load other than the axial load due to the upper die 2 and the lower die 3 may be applied to the lens-barrel 10.

That is, in this embodiment, the reference surface 31 and the fitting portion 32 are molded on the lower die 3 having the transfer surface 3A, and the fitting portion 32 provided with the transfer surface 3A in the center portion of the end (top surface) thereof is inserted and fitted into the lens-barrel 10, and further the lens-barrel 10 is placed on the reference surface 31, thereby positioning the lens-barrel 10 with respect to the lower die 3. That is, the lens-barrel 10 is held on the lower die 3 such that the transfer surface 3A may be placed at the optical element-forming position in the lens-barrel 10.

Further, for the lens-barrel 10 held on the lower die 3, the optical raw material 20 is placed in the lens-barrel (on the transfer surface 3A of the lower die 3). The optical raw material 20 is sandwiched, heated and pressurized between the transfer surface 3A of the lower die 3 and the transfer surface 2A of the upper die 2, and thus the optical element is integrally formed in the lens-barrel 10, thereby preventing the optical-axis deviation and axial position deviation of the optical element with respect to the lens-barrel 10, and remarkably reducing the optical-axis deviation caused by design looseness particularly significant in the case of manufacturing a small optical element with a lens-barrel.

Figure 6:
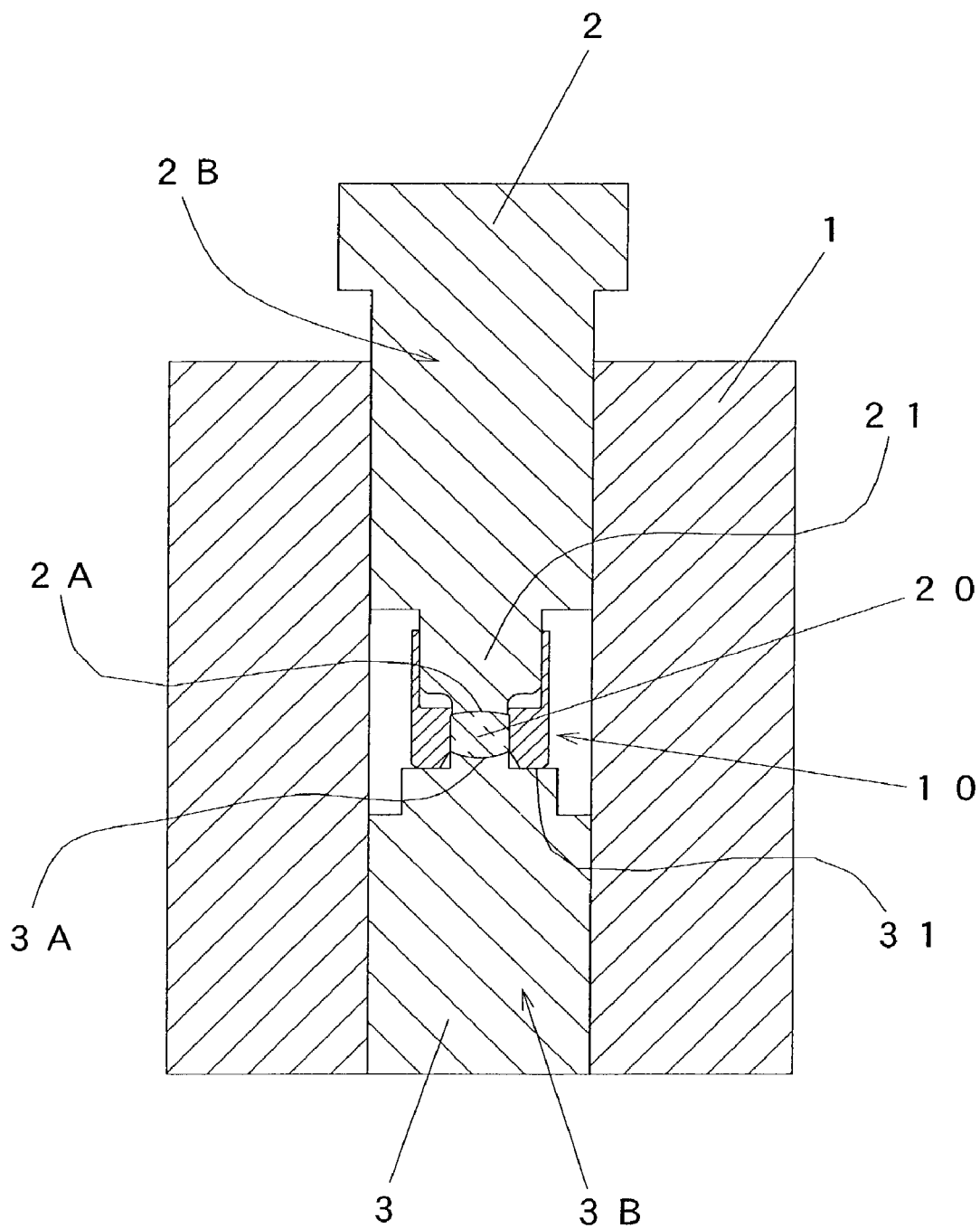
FIG. 6 shows a cross sectional view of a molding die according to a second embodiment of the invention.

FIG. 6 shows a cross sectional view of a molding die for an optical element with a lens-barrel according to a second embodiment of the invention. The figure shows a molding die for forming an optical element with a lens-barrel, in which the optical element is tightly joined to the inner peripheral surface on the lower end side of the lens-barrel 10, which is set in the molding die comprising the guide die 1, upper die 2, and lower die 3.

In the same manner as the first embodiment, the present embodiment also comprises the tubular guide die 1, the upper die 2 and lower die 3 molded like a circular cylinder. Here, the optical raw material (or glass raw material) 20 placed in the lens-barrel 10 is sandwiched, heated and pressurized between the upper die 2 and lower die 3 sliding in the tubular guide die 1. Thereby, the transfer surfaces 2A and 3A are transferred to the optical raw material 20 to mold an optically functioning surface thereon, and at the same time, the optical raw material is caused to flow in the outer periphery direction thereof, causing the outer edge of the raw material to be tightly joined to the inner peripheral surface of the lens-barrel 10. Thus, an optical element with a lens-barrel in which the optical element is integrally formed in the lens-barrel is manufactured.

In the embodiment, the reference surface 31, on which the lens-barrel 10 is to be placed, is provided on the outer periphery of the transfer surface 3A provided in the center portion of the end (top surface) of the lower die 3.

Also in the embodiment, the reference surface 31 adjusts the axial position of the lens-barrel 10 such that the transfer surface 3A may be placed at the optical element-forming position in the lens-barrel 10. Also, in order to avoid the optical-axis deviation and inclination of the optical element integrally formed in the lens-barrel 10, the reference surface 31 is molded in a circular mold centering the transfer surface 3A on the outer periphery of the transfer surface 3A, which is molded in the center portion of the top surface of the lower die 3, and at the same time, the reference surface 31 is molded to be horizontal with respect to the center axis of the lower die 3, thus providing a configuration such that the lens-barrel 10 placed on the reference surface 31 may not incline with respect to the center axis of the lower die 3. That is, the lens-barrel 10 is set in the molding die such that the optical axis of the optical element integrally formed in the lens-barrel cannot incline.

Further, in the embodiment, in order to cause the optical raw material 20 to tightly join to the inner peripheral surface on the lower end side of the lens-barrel 10, the fitting portion 21 inserted and fitted in the inner periphery of the lens-barrel 10 is molded on the upper die 2, and the transfer surface 2A is molded in the center portion of the end (bottom surface) of the fitting portion 21.

The fitting portion 21 molded on the upper die is molded by projecting the center portion of bottom surface of the upper die 2 in the axial direction, and guides the transfer surface 2A molded on the end of the fitting portion 21 to the optical element-forming position in the lens-barrel.

The outside diameter of the fitting portion 21 molded on the upper die 2 is designed to the inner diameter of the lens-barrel 10. By causing the lens-barrel 10 to fit on the fitting portion 21, the setting position of the lens-barrel 10 set in the molding die is determined to prevent the optical-axis deviation of the optical element integrally formed in the lens-barrel.

That is, in the second embodiment, the reference surface 31 is molded on the lower die 3 having the transfer surface 3A, and the lens-barrel 10 is placed on the reference surface 31, thereby holding the lens-barrel 10 on the reference surface 31 and also placing the transfer surface 3A at the optical element-forming position in the lens-barrel 10. Further, after the optical raw material 20 is placed in the lens-barrel (on the transfer surface 3A), the fitting portion 21 of the upper die 2 provided with the transfer surface 2A in the center portion of the end (bottom portion) of the fitting portion is fitted and inserted in the lens-barrel 10. Thus, the optical raw material 20 placed in the lens-barrel is sandwiched, heated and pressurized between the transfer surface 3A of the lower die 3 and the transfer surface 2A of the upper die 2 to cause the optical element to be integrally formed in the lens-barrel 10, thereby preventing the axial position deviation and optical-axis deviation of the optical element with respect to the lens-barrel 10.

That is, according to the molding die of the first and second embodiments, the optical element integrally formed on the inner peripheral surface of the end of the lens-barrel 10 can be manufactured as an optical element with a lens-barrel configured without the optical-axis deviation and position deviation.

Also, in the case of molding the optical element on the intermediate inner-peripheral-surface of the lens-barrel 10, the reference surface 31, on which the lens-barrel 10 is placed, is provided on the top surface of the lower die 3, and also the fitting portions to be fitted in the lens-barrel placed on the reference surface 31 may be provided for the upper die 2 and lower die 3 (fitting portion 21, fitting portion 32), and the transfer surfaces 2A and 3A may be provided on the ends of the fitting portions 21 and 32. Further, the reference surface 31 molded on the lower die 3 is provided on the outer periphery of the fitting portion 32 in the same manner as in the lower die 3 of the first embodiment, and the axial position of the reference surface 31 is adjusted such that the transfer surface 3A molded on the end (top surface) of the fitting portion 32 may be placed at the optical element-forming position of the lens-barrel 10.

As described above, according to the invention, in a molding die for an optical element with a lens-barrel in which a lens-barrel is set in the molding die comprising a tubular guide die, a lower die and upper die sliding in the guide die, also an optical raw material is placed in the guide die, and the optical raw material is sandwiched, heated and pressurized between the upper die and the lower die, thereby integrally forming the optical element in the lens-barrel, a reference surface on which the lens-barrel is placed is molded on the lower die and also fitting portions of which outside diameters are designed to the inner diameter of the lens-barrel is molded on the upper die or/and the lower die, and the inner periphery of the lens-barrel is fitted on the fitting portion and also the lens-barrel is placed on the reference surface, holding the lens-barrel, thereby allowing the prevention of the position deviation and optical-axis deviation of the optical element integrally formed in the lens-barrel. Also, in the molding die according to the invention, the lens-barrel is fitted on the fitting portion having a transfer surface provided thereon, thus holding (positioning) the lens-barrel. This achieves remarkable reduction of the optical-axis deviation caused by design looseness particularly significant in the case of manufacturing a small optical element with a lens-barrel.

What is claimed is:

1. A molding die for an optical element with lens-barrel being set in the molding die and receiving an optical material, said die comprising:
   a tubular guide die;
   upper and lower die;
   said upper and lower die being axially slidable in said guide die so that center axises of said upper and lower die are coincident with a center axis of said tubular guide and lens-barrel;
   outside diameter portions of said upper and lower die equaling an inner diameter of said guide die;
   a reference surface being disposed on an outer periphery of a top surface of said lower die for supporting the lens-barrel;
   said lower die including an axially and centrally projecting fitting portion, said fitting portion projecting into an inner periphery of said lens-barrel and positioning said lens-barrel, and said reference surface perpendicularly intersecting with an outer peripheral surface of said fitting portion;
   a lowermost surface of said upper die and an uppermost surface of said lower die having opposing axially and centrally projecting transfer surfaces, said transfer surfaces respectively projecting into respective upper and lower openings of the lens-barrel and engaging upper and lower surfaces of the optical raw material; and
   said upper and lower die sandwiching, heating, and pressurizing the optical element between said transfer surfaces so that the optical element is integrally formed in the lens-barrel.

* * * * *